United States Patent [19]

Shepherd

[11] 4,343,283
[45] Aug. 10, 1982

[54] DIESEL ENGINE FUEL PREHEATING SYSTEM

[76] Inventor: Clarence R. Shepherd, 3008 S. Mebane St., Burlington, N.C. 27215

[21] Appl. No.: 198,772

[22] Filed: Oct. 20, 1980

Related U.S. Application Data

[63] Continuation-in-part of Ser. No. 97,329, Nov. 26, 1979.

[51] Int. Cl.³ .............................................. F02N 31/00
[52] U.S. Cl. .................................... 123/557; 123/552; 123/514
[58] Field of Search ................ 123/557, 552, 514, 459

[56] References Cited

U.S. PATENT DOCUMENTS

| | | | |
|---|---|---|---|
| 3,110,296 | 11/1963 | Lundi | 123/557 |
| 3,354,872 | 11/1967 | Gratzmuller | 123/557 |
| 3,955,546 | 5/1976 | Lee | 123/557 |
| 4,099,499 | 7/1978 | Giardini | 123/557 |
| 4,249,502 | 2/1981 | Houer | 123/557 |

*Primary Examiner*—Ronald H. Lazarus
*Attorney, Agent, or Firm*—B. B. Olive

[57] ABSTRACT

A fuel injection diesel engine is equipped with auxiliary apparatus which utilizes the engine coolant and the coolant temperature control as well as an auxiliary temperature control for preheating the diesel fuel prior to injection to increase fuel efficiency.

2 Claims, 2 Drawing Figures

DIESEL ENGINE FUEL PREHEATING SYSTEM

CROSS-REFERENCE TO RELATED APPLICATION

This application is a continuation-in-part of copending application Ser. No. 097,329, filed Nov. 26, 1979, entitled "Diesel Engine Fuel Preheating System".

TECHNICAL FIELD

The present invention relates to apparatus associated with a fuel injection diesel engine for heating the fuel prior to injection.

BACKGROUND ART

Fuel injection diesel engines are widely employed in the trucking industry. It is known that such engines operate most efficiently when the coolant temperature is controlled. Thus, it is customary to have a thermostatically-controlled cooling system associated with such engines. It has also been the practice to utilize fuel pumps which in effect pump an excess of diesel fuel to the engine and are provided with means to divert back to the fuel tanks such excess fuel as is not required to operate the engine at the particular time the fuel is being pumped. Typically, the fuel which is pumped to the engine reaches the engine at ambient temperature.

It has been previously recognized that diesel engine efficiency and, thus, miles obtained per gallon of diesel fuel consumed have some relation to the temperature of the diesel fuel at the time it reaches the fuel injection system associated with the diesel engine. Suggestions have been made in the prior art literature that the engine coolant as well as the exhaust gas apparatus could be used as a source of heat for heating the diesel fuel prior to injection. However, so far as is known, until the introduction of applicant's copending application apparatus, the trucking industry had never been provided with a practical auxiliary apparatus which would be incorporated into the fuel supply system of the truck engine and use the engine coolant as a source of heat to increase the fuel efficiency. Thus, the general object of the invention is to increase the fuel efficiency, i.e., the miles obtained per gallon of diesel fuel consumed, of a fuel injection diesel engine such as widely employed in tractor-trailer rigs. A more specific object is to improve upon the apparatus of copending application Ser. No. 097,329. Other objects will appear as the description proceeds.

DISCLOSURE OF INVENTION

The system and apparatus of the present invention is based on storing, preheating and delivering preheated fuel to a conventional fuel injection diesel truck engine. A conventional fuel pump is arranged to draw the fuel through a conventional fuel filter from an insulated fuel preheat tank which in turn receives the fuel by gravity feed both from a pair of vented fuel tanks as well as from an auxiliary overflow fuel tank arranged to store excess fuel pumped to the engine. The preheat tank is equipped with a series of coils inside the tank through which hot engine coolant is bypassed and returned to the engine cooling system. An optimum fuel temperature has found to be within the range of 140° F. to 150° F. All fuel which passes through the preheat tank is thus preheated to a temperature of at least 140° but preferably not in excess of 150° F. The coolant temperature admitted to the preheat tank is controlled by the conventional thermostatic coolant control of the diesel engine employed to power the truck/tractor unit. The invention apparatus also provides an additional temperature control which stops flow of the hot coolant from the engine to the fuel preheat tank whenever the temperature of the fuel being supplied to the engine exceeds 150° F. and reestablishes such flow of hot coolant to the fuel preheat tank whenever the temperature of the fuel being admitted to the engine drops to 140° F. An optimum fuel admission temperature is thereby achieved which has resulted in substantial improvement in the number of miles obtained per gallon of fuel consumed by the diesel truck engine. Also, as compared to the apparatus of copending application Ser. No. 097,329, the employment of an overflow tank for receiving excess fuel from the engine prior to being recycled through the fuel preheat tank has greatly improved the overall operation of the invention system.

BEST MODE FOR CARRYING OUT THE INVENTION

Figure 1:
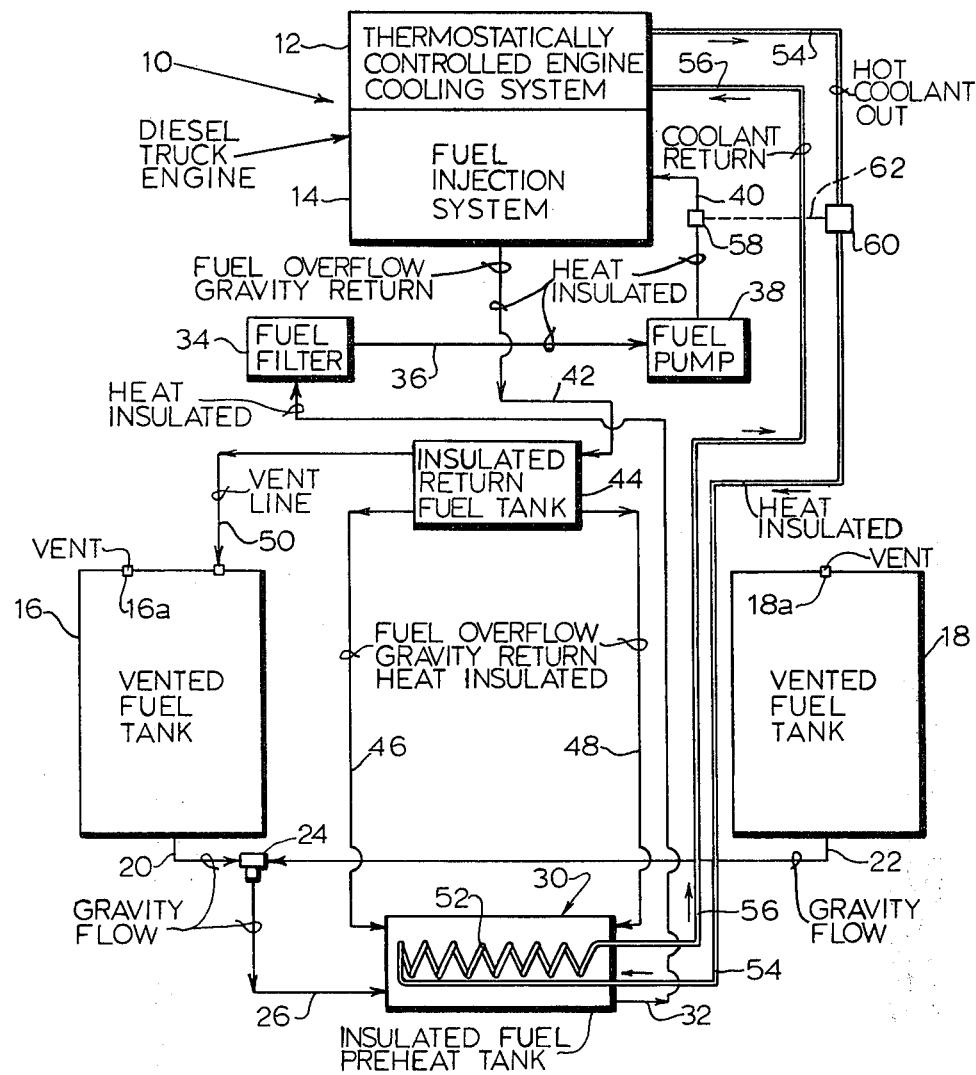
FIG. 1 is a diagrammatic representation of the system and apparatus of the invention utilizing a return fuel tank for the excess fuel and a insulated fuel preheat tank for heating the fuel prior to admission to the engine.
Figure 2:
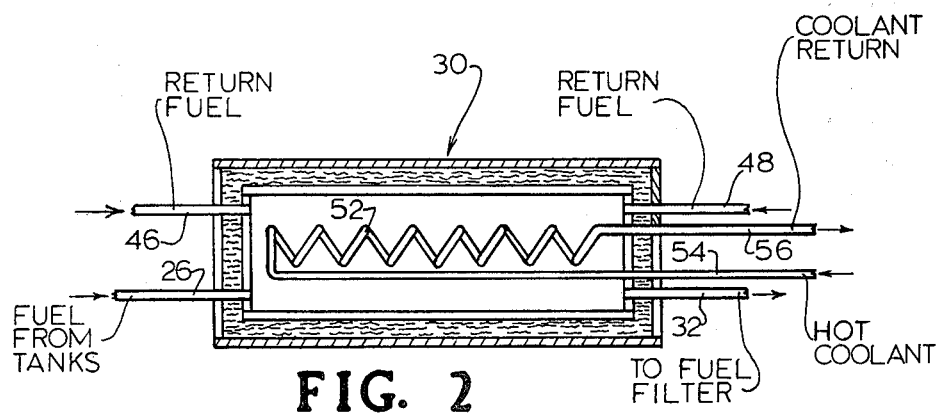
FIG. 2 is a diagrammatic sectional view through the insulated fuel preheat tank illustrated in FIG. 1.

FIG. 1 schematically represents the components of the system and apparatus of the invention adapted for mounting on conventional diesel truck engines and tractor units. Referring specifically to FIG. 1, diesel truck engine 10 includes a thermostatically-controlled engine cooling system 12, typically set at 180° F. in a fuel injection system 14. Fuel stored in the main fuel tanks 16, 18 which are connected by fuel lines 20, 22, respectively, flows to a T coupling 24 which in turn connects to a single fuel supply line 26. From T coupling 24, the fuel is gravity fed from fuel tank 16, 18 into insulated fuel preheat tank 30 through line 26. Tank 30 is mounted on the tractor chassis below the level of the main fuel tanks 16, 18 and below the level of return fuel tank 44. Return fuel tank 44 is also mounted so as to be above the level of fuel tanks 16, 18 and such mounting arrangements facilitate the illustrated gravity flow. Tank 16 is vented through vent 16a and tank 18 is vented through vent 18a. The fuel is drawn by suction from fuel preheat tank 30 through a heat insulated fuel line 32 to a fuel filter 34 and then through heat insulated line 36 to fuel pump 38. The preheated fuel is then pumped from fuel pump 38 through heat insulated line 40 into fuel injection system 14 of diesel truck engine 10.

Excess fuel from fuel injection system 14 is returned through heat insulated line 42 to heat insulated return fuel tank 44. Heat insulated fuel overflow return lines 46, 48 gravity feed overflow fuel from return fuel tank 44 to fuel preheat tank 30. A vent line 50 extends from return fuel tank 44 to fuel tank 16. Line 50 serves as a vent for fuel tank 44 and preheat tank 30. Vent line 50 may also serve as an additional overflow line from tank 44 to tank 16 whenever required by operation of the system.

Fuel preheat tank 30 in one embodiment was made with a ten gallon capacity and was formed of metal plate through other suitable materials may be employed. Within tank 30 there is mounted a heating coil 52 comprising a single length of appropriate size copper tubing rolled into coils with copper being selected because of its high heat conductivity property. One end of the tubing forming coil 52 is connected to an insulated coolant line 54 which brings hot coolant from cooling system 12 of engine 10 to coil 52. The opposite end of the tubing forming coil 52 is connected to a noninsulated coolant return line 56 to return the coolant to engine 10 to be reheated. Coil 52 thus effectively provides heat exchange means for exchanging heat from the coolant, normally at approximately 180° F., with the fuel which is normally at a substantially lower temperature.

Pump suction draws the preheated fuel from tank 30 through heat insulated line 32 to fuel filter 34 and through heat insulated line 36 into fuel pump 38. Pump 38 is connected to pump the now preheated diesel fuel to fuel injection system 14 through heat insulated line 40 to be consumed by engine 10. Another heat insulated line 42 provides the typical fuel overflow return line enabling the excess fuel in the preheated condition to be pumped back from injection system 14 through return fuel tank 44 and heat insulated line 46 to insulated fuel preheat tank 30. Fuel pump 38 utilizing a conventional diesel engine fuel pump construction is equipped so as to automatically control the relative amount of fuel discharged through line 40 at any instant of time dependent upon the instantaneous demands of engine 10. Thus, the amount of excess fuel returned through line 42 will vary with instantaneous engine demands. While not indicated in the drawings, it is also contemplated that fuel filter 34 and fuel pump 38 could also be heat insulated with removable heat insulator means adapted to the usual maintenance and service requirements.

An auxiliary electrical switch type temperature probe 58 is mounted in fuel line 40 to sense the fuel temperature at all times after it exits fuel pump 38 and prior to entry into fuel injection system 14. Probe 58 is set to close at 150° F. and open at 140° F. A normally open solenoid valve 60 controlled by probe 58 through electrical line 62 is located in coolant line 54. Whenever the temperature of the fuel in line 40 exceeds 150° F. solenoid valve 60 closes and prevents the heated coolant from further heating the fuel in tank 30. However, when the temperature of the fuel in line 40 drops below 140° F., valve 60 opens and allows the heated coolant to raise the temperature of the fuel in line 40. In operation, the diesel fuel admitted to fuel injection system 14 is thus preheated to a temperature of between 140° F. and 150° F. and maintained there by temperature probe 58 and solenoid valve 60 working in conjunction with the thermostatically controlled cooling system 12 which normally maintains the coolant at approximately 180° F. by conventional thermostat controls.

Recognition is made of the fact that the typical diesel tractor employs a pair of main fuel tanks. Therefore, the invention is illustrated with this application in mind. However, the use of the terminology "tanks" in the description and claims should be understood as being intended to cover either the typical plural tank arrangement or a single main fuel tank since the invention adapts readily to either type of fuel storage when associated with a fuel injection type diesel engine.

I claim:

1. A fuel preheat system for use with a diesel engine equipped with a fuel injection system and a thermostatically-controlled engine cooling system for circulating an engine coolant and fed with diesel fuel supplied by a fuel pump from main fuel tanks positioned near said engine, comprising:
    (a) a heat insulated fuel preheat tank, said fuel preheat tank being gravity fed from the engine's main fuel tanks and providing means for storing a portion of said fuel to be consumed by said engine;
    (b) heat exchange means operatively associated with said fuel preheat tank and said cooling system of said engine enabling said portion of said fuel stored in said fuel preheat tank to be heated within a predetermined temperature range while contained therein;
    (c) a heat insulated overflow fuel return tank adapted for receiving excess fuel supplied to said fuel injection system and for gravity feeding such excess fuel initially to said fuel preheat tank and in the event of need for gravity feeding any additional amounts to said main fuel tanks;
    (d) a pump and piping system operatively associated with said fuel preheat tank, said overflow fuel return tank, and the main fuel tanks associated with said engine, said pump and piping system enabling fuel to be continuously drawn from said main fuel tanks, pumped through and heated in said preheat fuel tank to a temperature within said predetermined temperature range, then to be admitted in a preheated condition to said fuel injection system in said engine whereby to decrease the fuel consumption requirements of said engine for a given load and load condition placed thereon as compared to the fuel consumption requirements of said engine for the same load and load condition utilizing the same said fuel at ambient temperature, return and excess preheated fuel to said overflow fuel return tank and then transfer said fuel from said overflow fuel return tank to said fuel preheat tank for recycling; and
    (e) auxiliary temperature control means for controlling the flow of hot engine coolant from the engine cooling system to said heat exchange means whereby to establish said predetermined temperature range.

2. A fuel preheat systemd as claimed in claim 1 wherein said temperature range is within 140° F. to 150° F.

* * * * *

UNITED STATES PATENT AND TRADEMARK OFFICE
CERTIFICATE OF CORRECTION

PATENT NO. : 4,343,283
DATED : August 10, 1982
INVENTOR(S) : Clarence R. Shepherd It is certified that error appears in the above—identified patent and that said Letters Patent is hereby corrected as shown below:

Col. 2, line 67, correct "through" to --though--

Col. 4, line 44, correct "and" to --any--

Col. 4, line 54, correct "systemd" to --system--

Signed and Sealed this

Nineteenth Day of October 1982

[SEAL]

Attest:

Attesting Officer

GERALD J. MOSSINGHOFF

Commissioner of Patents and Trademarks